No. 691,345. Patented Jan. 21, 1902.
L. F. ADT.
EYEGLASSES.
(Application filed June 24, 1901.)
(No Model.)
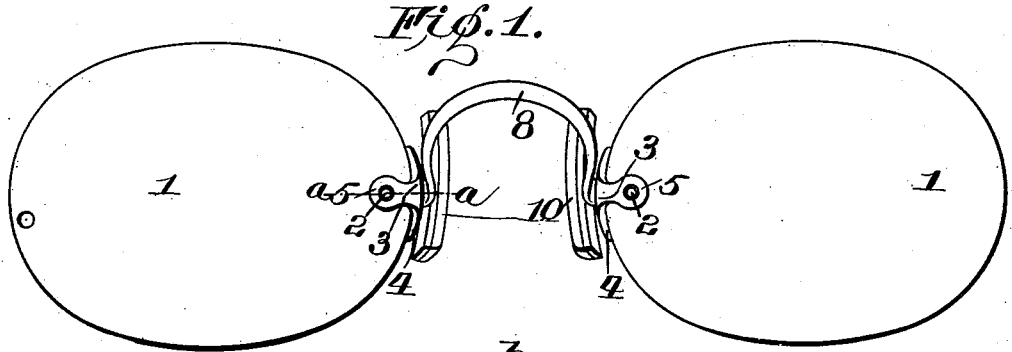
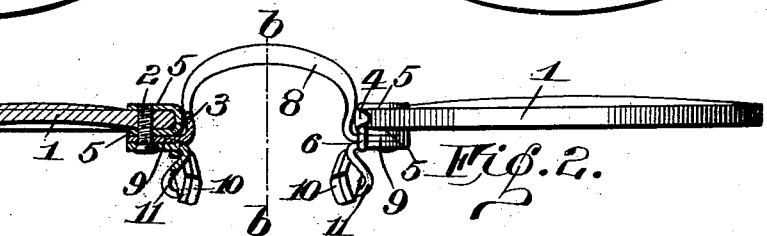
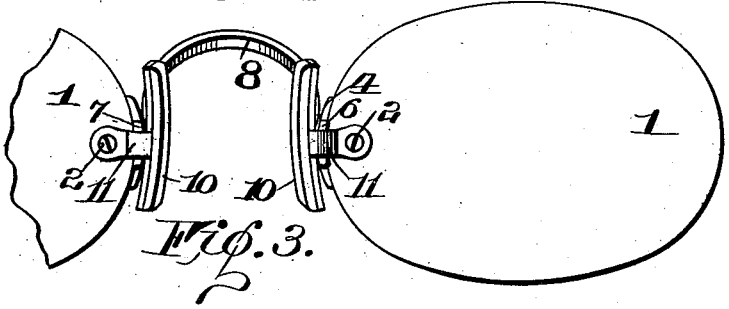
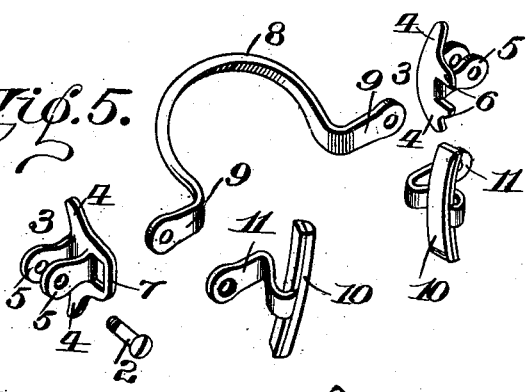
Witnesses. Inventor.
Walter B. Payne  Leo F. Adt
G. Willard Rich  by Frederick F. Church
                 Attorney
THE NORRIS PETERS CO., PHOTO-LITHO., WASHINGTON, D. C.

UNITED STATES PATENT OFFICE.

LEO F. ADT, OF TROY, NEW YORK.

EYEGLASSES.

SPECIFICATION forming part of Letters Patent No. 691,345, dated January 21, 1902.

Application filed June 24, 1901. Serial No. 65,727. (No model.)

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the numerals marked thereon.

My present invention relates to improvements in eyeglasses, and has for its object to provide means for facilitating the construction, assemblage, and repair thereof and also providing a range of adjustment greater than that ordinarily permitted in devices of this general nature; and to these and other ends the invention consists in certain improvements hereinafter described, the novel features being pointed out in the claims at the end of this specification.

In the drawings, Figure 1 is a front elevation of a pair of eyeglasses embodying my improvements; Fig. 2, a plan view of the same with one of the lenses and connecting parts shown in section on the line $a\,a$ of Fig. 1; Fig. 3, a rear view; Fig. 4, a sectional view on the line $b\,b$ of Fig. 2; Fig. 5, a perspective view showing the various parts of the mounting separated.

Similar reference-numerals in the several figures indicate similar parts.

1 1 indicate the lenses, of any suitable construction and provided at the inner edges with the transverse perforations for the application of the screws 2 of the holding-clips 3. The clips 3 in the present embodiment of my invention are constructed, as usual, of sheet metal, having the vertically-extending arms 4 4, for engaging the edges of the lenses, and preferably two parallel perforated ears 5, though one of the latter is all that is necessary. On the inner side of the clips are also formed guide-ears 6, separated somewhat, as shown at the right of Fig. 5, or, if desired, these lugs or ears may be connected by a piece 7, said ears forming, whether connected or not, a recess for the reception of the bridge-piece or bow-spring and for the shanks of the nose-guards. 8 indicates a bridge-piece or bow, preferably of spring metal, and in the present instance extending at an angle to the vertical plane of the lenses and adapted to rest upon the bridge of the nose of the wearer, the bow or forward portion of said bridge extending forwardly of the lenses, while the laterally-extending perforated ends 9 project over the clips 3 on the rear of the lenses, said ends being guided and held between the lugs 6 of the clips. The nose-guards may be of any suitable construction, each embodying a pad 10, which is adapted to rest upon the nose of the wearer, and the shank 11, which latter is preferably of more or less flexible material, and when the parts are assembled this shank also extends between the ears 6 on the clips and over the ends 9 of the bridge or bow, so that the guard, clip, lens, and one end of the bridge may be connected by a single screw 2, extending laterally through the perforated lugs and the lens, as shown.

In addition to constructing the parts so that one screw or attaching device connects all of the parts on one side of the center of the bow it will be noted that the overlapping ends of the bridge, guard, and clip are arranged in the same horizontal plane, so that they are not visible when viewed from the front, thereby giving the glasses the appearance of being much lighter than usual, and, furthermore, by the connection of the ends of the bridge-piece in rear of the lenses, as shown, and extending the parts near the ends close to the lenses, as shown, not only may the lenses be brought closer together for persons whose pupilary distance is short, but a greater range of lateral adjustment is permitted by this metal next the lens than where the ends of the bridge or spring are attached directly to the edges of the lenses, as usual. The shanks of the nose-guard are of such nature that they may be readily bent or altered to cause the pads to bear with proper force and in proper position upon the sides of the nose of the wearer.

While but a single attaching-screw is provided for each lens, it will be noted that the parts are so arranged and constructed that different-shaped guards or bridges may be employed, so that the glasses may be readily adapted for persons having abnormal facial characteristics, and any repairs may be readily made or parts replaced without destroying the entire mounting or using other means for dismantling the glasses than an ordinary screw-driver.

I claim as my invention—

1. In eyeglasses, the combination of the lenses, clips at the edge thereof and a bridge having its central portion extending forward of the lens and having its ends extended laterally in rear of and substantially parallel with the lenses and the screws passing through the ends of the bridge, the clips and the lenses, for securing the parts together, the portion of the bridge ends extending laterally of the lenses being free for adjustment.

2. In eyeglasses, the combination with the lenses having the perforations near the inner edges, the clips, the bridge having the laterally-extending ends in rear of the lenses and the screws passing through the lenses and clips and securing the latter to the bridge, the portion of the bridge extending laterally of the lenses being free for adjustment.

3. In eyeglasses, the combination with the lenses having the perforations near the inner edges, the clips, the bridge having the central portion extending forward of the lenses, and the ends extending laterally over the rear thereof and engaging the clips to prevent movement independently thereof and the securing-screws passing through the lenses and clips and engaging the ends of the bridge to secure the parts, the portion of the bridge extending laterally of the lenses being free for adjustment.

4. In eyeglasses, the combination with the lenses having the perforations near their edges, and the clips having the ears, of the bridge having the laterally-extending ends arranged between the ears, and the screws passing through the lenses, and the ends of the bridge and engaging the clips.

5. In eyeglasses, the combination with the lenses having the perforations near their edges, the clips and the nose-guards, of the bridge having the laterally-extended ends arranged on the same side of the lenses as the nose-guards and engaging the latter, and the securing devices passing laterally through the lenses, clips, nose-guards and the ends of the bridge.

6. In eyeglasses, the combination with the lenses having the perforations near their edges and the clips having the ears thereon, of the bridge having the laterally-extending ends, arranged between the ears on the clips, the nose-guards having the shanks between the ears on the clips and the securing devices each passing through the lenses, clips, shanks and the ends of the bridge.

7. In eyeglasses, the combination of a lens, a bridge having its end extending over and in a plane parallel with the face of the lens, a separate nose-guard having a shank in contact with the bridge end on one face of the lens, and a single fastening device passing laterally through the lens, guard-shank, and bridge end.

8. In eyeglasses, the combination of a lens, a bridge-piece having its central portion arranged forward of the lens and the end extending over the rear face of the lens and substantially parallel therewith, a nose-guard having a shank substantially parallel with the face of the lens and on the same side thereof as the bridge end and a single fastening device extending through the bridge end, guard-shank and the lens for securing the parts together.

9. In eyeglasses, the combination with the lenses and the clips at the edge thereof, of a bridge separate from the clips having the central portion extending forwardly of the lenses and the laterally-extending ends located in rear of the lenses and means for securing the parts together, the portion of the bridge extending laterally of the lenses being free for adjustment.

10. In eyeglasses, the combination with the lenses, of a bridge connecting the lenses having its central portion extending forwardly of the rear faces of the lenses and the laterally-extending ends located upon and secured to the rear sides of the lenses, the portion of the bridge near the ends lying close to the edges of the lenses, and nose-guards located in rear of the lenses and connected to the latter and to the bridge.

11. In eyeglasses the combination with the lenses, and the nose-guards located in rear of the latter, of the bridge-piece having the central portion extending forwardly of the lenses, and the laterally-extending ends secured to the nose-guards and located in rear of the front faces of the lenses, the portion of the bridge extending laterally of the lenses being free for adjustment.

12. In eyeglasses, the combination with the perforated lenses having the clips extending from the edges of the lenses to the perforations therein, of the bridge having the ends extending over the lenses and engaging the clips to prevent lateral movement thereon, the guards separate from the clips but adapted to engage therewith and the separate fastening devices extending through the lenses, clips, guards and bridge ends to secure the parts.

LEO F. ADT.

Witnesses:
EDWARD MURPHY, 2d,
JAMES F. BYRNE.